US011214220B2

(12) United States Patent
Yoshimura et al.

(10) Patent No.: US 11,214,220 B2
(45) Date of Patent: Jan. 4, 2022

(54) AIR BAG DEVICE

(71) Applicant: MAZDA MOTOR CORPORATION, Hiroshima (JP)

(72) Inventors: Mie Yoshimura, Hiroshima (JP); Teruhiko Hiruta, Hiroshima (JP); Taei Shibahara, Hiroshima (JP); Takahiro Narikawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 32 days.

(21) Appl. No.: 16/645,655

(22) PCT Filed: Aug. 23, 2018

(86) PCT No.: PCT/JP2018/031061
§ 371 (c)(1),
(2) Date: Mar. 9, 2020

(87) PCT Pub. No.: WO2019/065012
PCT Pub. Date: Apr. 4, 2019

(65) Prior Publication Data
US 2020/0282942 A1    Sep. 10, 2020

(30) Foreign Application Priority Data

Sep. 29, 2017    (JP) .............................. JP2017-189456

(51) Int. Cl.
*B60R 21/231*    (2011.01)
*B60R 21/207*    (2006.01)
(Continued)

(52) U.S. Cl.
CPC .............. *B60R 21/231* (2013.01); *B60N 2/22* (2013.01); *B60N 2/42745* (2013.01);
(Continued)

(58) Field of Classification Search
CPC ................ B60R 21/231; B60R 21/207; B60R 2021/23153; B60R 2021/23169;
(Continued)

(56) References Cited

U.S. PATENT DOCUMENTS 5,975,565 A * 11/1999 Cuevas .................. B60N 2/433
280/728.2
10,434,966 B2 * 10/2019 Ghannam ......... B60R 21/01554
(Continued)

FOREIGN PATENT DOCUMENTS

CN    202283906 U    6/2012
DE    4137719 A1 *    9/1992    ............. B60N 2/879
(Continued)

OTHER PUBLICATIONS

International Search Report issued in PCT/JP2018/031061; dated Oct. 23, 2018.
(Continued)

*Primary Examiner* — Keith J Frisby
(74) *Attorney, Agent, or Firm* — Studebaker & Brackett PC (57) ABSTRACT

An air bag device to be installed in a vehicle provided with a front seat and a rear seat disposed away from each other in a front-rear direction of the vehicle, and a reclining mechanism provided in the front seat to allow a seat back to pivot about a reclining pivot axis includes an air bag that deploys from a back surface of the seat back of the front seat toward the rear seat. At least an upper rear portion of the air bag in a deployed state is formed into an arc shape about the reclining pivot axis in a side view of the vehicle.

4 Claims, 9 Drawing Sheets

(51) Int. Cl.
   *B60N 2/22* (2006.01)
   *B60N 2/427* (2006.01)
(52) U.S. Cl.
   CPC .. *B60R 21/207* (2013.01); *B60R 2021/23153* (2013.01); *B60R 2021/23169* (2013.01)
(58) Field of Classification Search
   CPC .... B60R 2021/0004; B60R 2021/2074; B60R 2021/0032; B60R 2021/0039; B60R 2021/0044; B60R 2021/0048; B60N 2/22; B60N 2/427; B60N 2/42745; B60N 2/20
   USPC ............................................ 280/728.2, 730.1
   See application file for complete search history.

(56) References Cited

U.S. PATENT DOCUMENTS

| | | | |
|---|---|---|---|
| 10,501,041 B2 * | 12/2019 | Faruque | ................ B60R 21/217 |
| 2002/0036398 A1 | 3/2002 | Wohllebe | |
| 2010/0133797 A1 | 6/2010 | Kim et al. | |
| 2015/0091280 A1 | 4/2015 | Nagasawa | |
| 2015/0091281 A1 * | 4/2015 | Nagasawa | .......... B60N 2/42709 280/730.1 |
| 2017/0036565 A1 | 2/2017 | Ohno et al. | |

FOREIGN PATENT DOCUMENTS

| | | |
|---|---|---|
| DE | 19916849 A1 | 10/2000 |
| JP | H03279051 A | 12/1991 |
| JP | 2002542100 A | 12/2002 |
| JP | 2017030636 A | 2/2017 |
| KR | 20120103103 A | 9/2012 |

OTHER PUBLICATIONS

Office Action issued in JP 2017-189456; mailed by the Japanese Patent Office dated Oct. 23, 2018.

The extended European search report issued by the European Patent Office dated Aug. 14, 2020, which corresponds to European Patent Application No. 18862094.2-1132 and is related to U.S. Appl. No. 16/645,655.

* cited by examiner

AIR BAG DEVICE

TECHNICAL FIELD

The present invention relates to an air bag device for a vehicle, which includes an air bag that deploys from a back surface of a seat back of a front seat toward a rear seat.

BACKGROUND ART

In recent years, needs for protecting passengers in a vehicle are increasing. In view of such needs, in a vehicle including a front seat and a rear seat disposed away from each other in a front-rear direction of the vehicle, there is a trend that an air bag device for a rear seat passenger to protect a passenger (a rear seat passenger) seated on the rear seat is provided. Among such air bag devices for rear seat passengers, there is known an air bag device provided in a seat back of a front seat in which a reclining angle of the seat back is adjustable.

In an air bag device for a rear seat passenger of this type, protection performance of a rear seat passenger may change due to a reclining angle of a seat back of a front seat. In other words, since a distance between the seat back and a rear seat passenger changes according to a reclining angle of the seat back of the front seat, for example, when the reclining angle is large, a deployed position of the air bag may be too close to the rear seat passenger. In view of the above, it is necessary to secure certain protection performance for a rear seat passenger, irrespective of a reclining angle of a seat back.

As an air bag device for solving this issue, Patent Literature 1 discloses a device.

The air bag device disclosed in Patent Literature 1 is configured to control adjustment of a deploying area of an air bag. Specifically, when collision of a vehicle is predicted, and an angle of a seat back of a front seat is equal to or larger than a predetermined angle, a reclining motor incorporated in the front seat is driven, and the seat back is raised in such a way that the angle of the seat back is set to an appropriate angle.

However, in the conventional air bag device disclosed in Patent Literature 1, since control and a structure become complicated, there is room for improvement in this point.

CITATION LIST

Patent Literature

Patent Literature 1: Japanese Unexamined Patent Application Publication No. 2017-30636

SUMMARY OF INVENTION

An object of the present invention is to provide an air bag device that enables to appropriately protect a rear seat passenger with a simplified structure, irrespective of a reclining angle of a seat back of a front seat.

The present invention is directed to an air bag device to be installed in a vehicle including a front seat and a rear seat disposed away from each other in a front-rear direction of the vehicle, and a reclining mechanism provided in the front seat to allow a seat back to pivot about a reclining pivot axis. The air bag device includes an air bag that deploys from a back surface of the seat back of the front seat toward the rear seat. At least an upper rear portion of the air bag in a deployed state is formed into an arc shape about the reclining pivot axis in a side view of the vehicle.

DESCRIPTION OF EMBODIMENTS

In the following, an embodiment according to the present invention is described in details with reference to the drawings.

Figure 1:
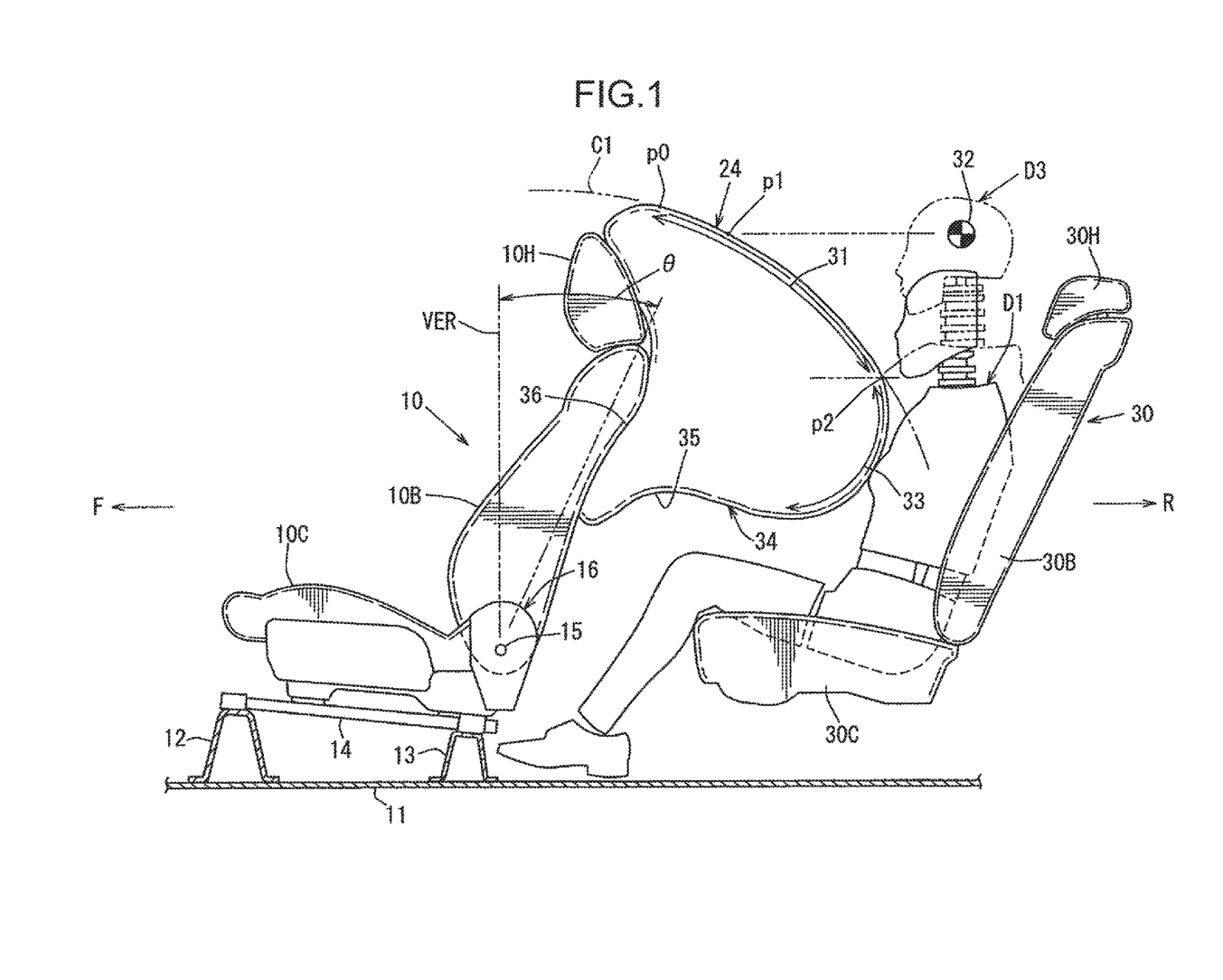
FIG. 1 is a side view illustrating an air bag device according to the present invention.
Figure 2:
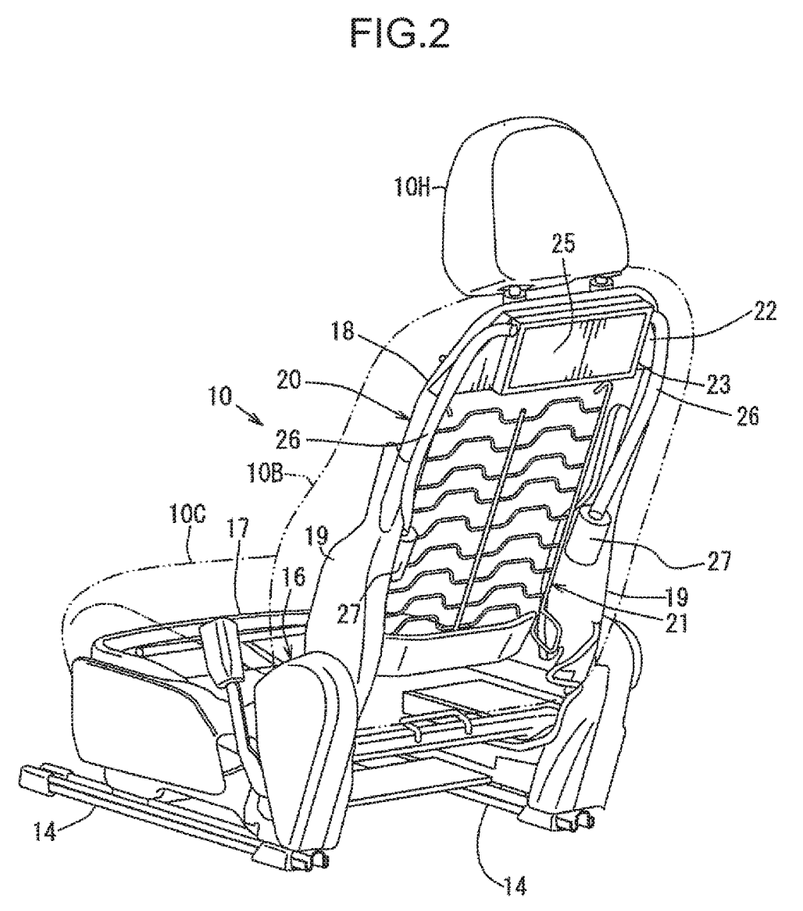
FIG. 2 is a perspective view illustrating a front seat.
Figure 3:
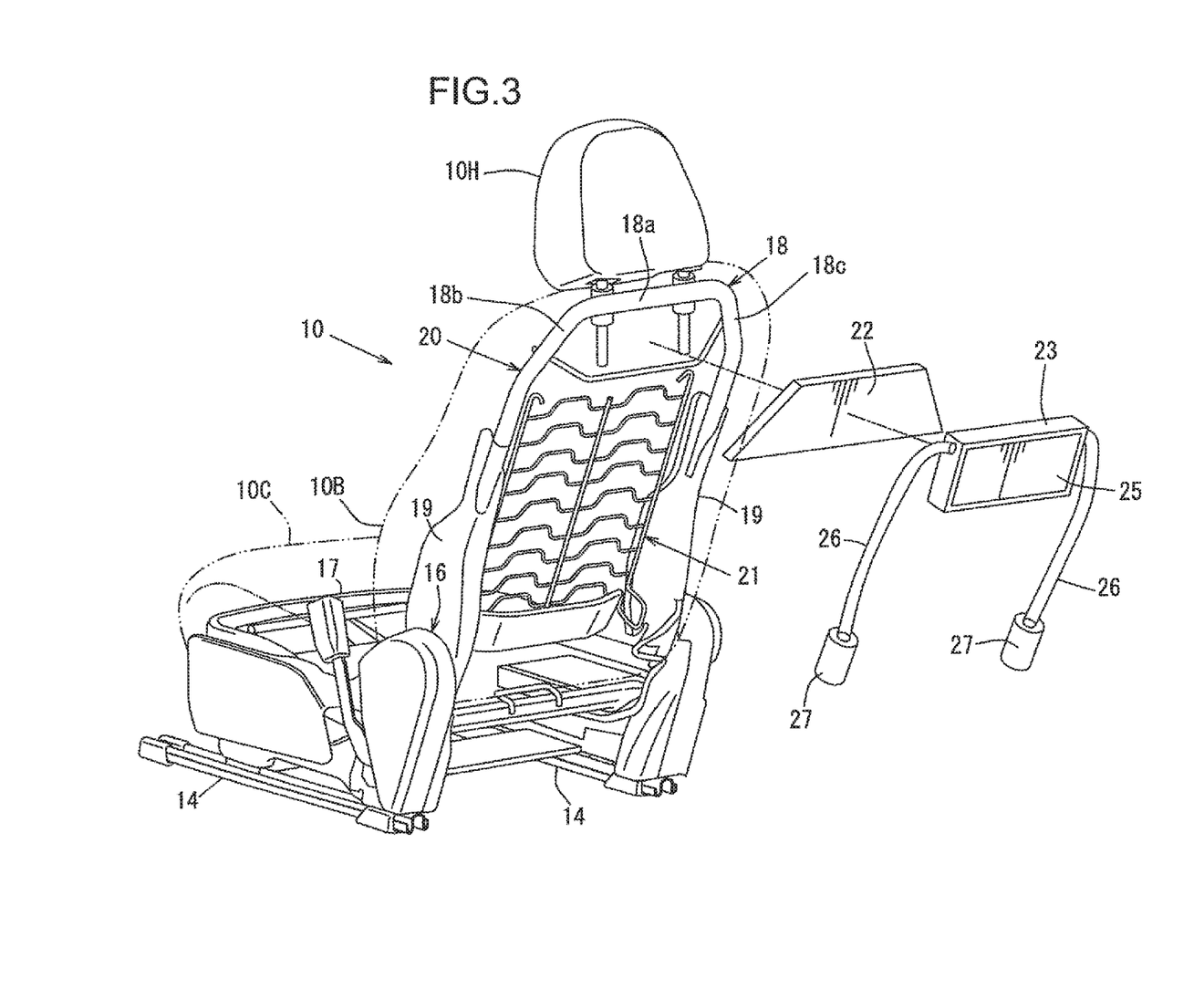
FIG. 3 is an exploded perspective view illustrating essential parts of the front seat.

FIG. 1 is a side view illustrating an air bag device according to the present invention (for convenience of illustration, illustrating a deployed state of an air bag). FIG. 2 is a perspective view illustrating a front seat. FIG. 3 is an exploded perspective view illustrating essential parts of the front seat. In the drawings, the arrow F indicates a vehicle front side, and the arrow R indicates a vehicle rear side.

Referring to FIG. 1, in a vehicle, a front seat 10 and a rear seat 30 are disposed side by side in such a way as to be away from each other in a front-rear direction of the vehicle (hereinafter, simply referred to as a front-rear direction).

When the front seat 10 is set as a driver's seat or a passenger's seat (a seat of a first row), it is possible to set the rear seat 30, as a seat of a second row immediately behind the front seat 10. Further, when the front seat 10 is set as a seat of a second row, it is possible to set the rear seat 30 as a seat of a third row.

As illustrated in FIG. 1, the front seat 10 is mounted in such a way that a position thereof is adjustable in the front-rear direction with respect to front and rear brackets 12 and 13 provided on an upper portion of a floor panel 11 via a pair of seat sliding rails 14 and 14 constituted of a lower rail (a fixed rail) and an upper rail (a movable rail). The front seat 10 includes a seat cushion 10C for forming a seating surface of a passenger, a seat back 10B for forming a back rest surface of the passenger, and a head rest 10H capable of adjusting a height for holding the head of the passenger.

As illustrated in FIG. 1, the front seat 10 includes a reclining mechanism 16 for allowing the seat back 10B to pivot about a reclining pivot axis 15 in such a way that an angle of the seat back 10B is adjustable.

As illustrated in FIGS. 2 and 3, the seat cushion 10C of the front seat 10 includes a seat cushion frame 17.

Further, the seat back 10B includes a seat back frame 20. The seat back frame 20 includes an upper frame 18 constituted of a metal pipe, located on an upper portion of the seat back frame 20, and formed into a gate shape in a rear view, and lower frames 19 and 19 made of sheet metal and located on both left and right sides of the seat back frame 20.

A suspension mat 21 constituted of a spring member is disposed between side portions of the seat back frame 20. A reaction plate 22 is mounted on an upper portion of the upper frame 18 constituting the seat back frame 20, specifically, as illustrated in FIG. 3, on a portion having high rigidity and surrounded by an upper side portion 18a and left and right leg portions 18b and 18c of the upper frame 18. A box-shaped air bag accommodation case 23 is mounted on a back surface of the reaction plate 22.

An air bag 24 (see FIG. 1) is accommodated in a folded state within an accommodation space of the air bag accommodation case 23. A fabric cover 25 is provided on a back surface of the air bag accommodation case 23 in such a way as to cover the folded air bag 24 from behind.

As illustrated in FIGS. 2 and 3, a pair of left and right gas supply pipes 26 and 26 are provided in such a way as to communicate with an interior of the air bag 24, which is accommodated in a folded state within the air bag accommodation case 23. The gas supply pipe 26 extends downwardly along the upper frame 18, and a lower end thereof is located on the inner side of the lower frame 19. An inflator 27 as a gas generator is mounted on a lower end of the gas supply pipe 26. A pair of left and right inflators 27, 27 are mounted on the lower frames 19 and 19 from the inner sides thereof.

The air bag device is constituted of the reaction plate 22 made of a steel plate or resin and configured to support a reaction force generated when the air bag 24 deploys, the air bag 24 as a bag member, the air bag accommodation case 23, the fabric cover 25, the gas supply pipe 26 constituted of a fabric tube or the like, and the inflator 27. The air bag device is configured in such a way that, when the vehicle collides or is predicted to collide, gas generated in the inflator 27 is supplied into the air bag 24 via the gas supply pipe 26 to thereby deploy the air bag 24 toward a passenger seated on the rear seat 30.

As a folding structure of the air bag 24, it is possible to employ a structure equivalent to a known folding structure of an air bag for an assistant driver's seat.

As illustrated in FIG. 1, the rear seat 30 includes a seat cushion 30C for forming a seating surface of a passenger, a seat back 30B for forming a back rest surface of the passenger, and a head rest 30H capable of adjusting a height for holding the head of the passenger.

The air bag device according to the embodiment is configured in such a way that the air bag 24 deploys from the back surface of the seat back 10B of the front seat 10 toward the rear seat 30 to protect a passenger seated on the rear seat 30. In other words, the air bag device is configured in such a way as to protect a passenger seated on the rear seat 30 by the air bag 24 that deploys from the back surface of the seat back 10B of the front seat 10 located immediately in front of the rear seat 30.

Figure 4:
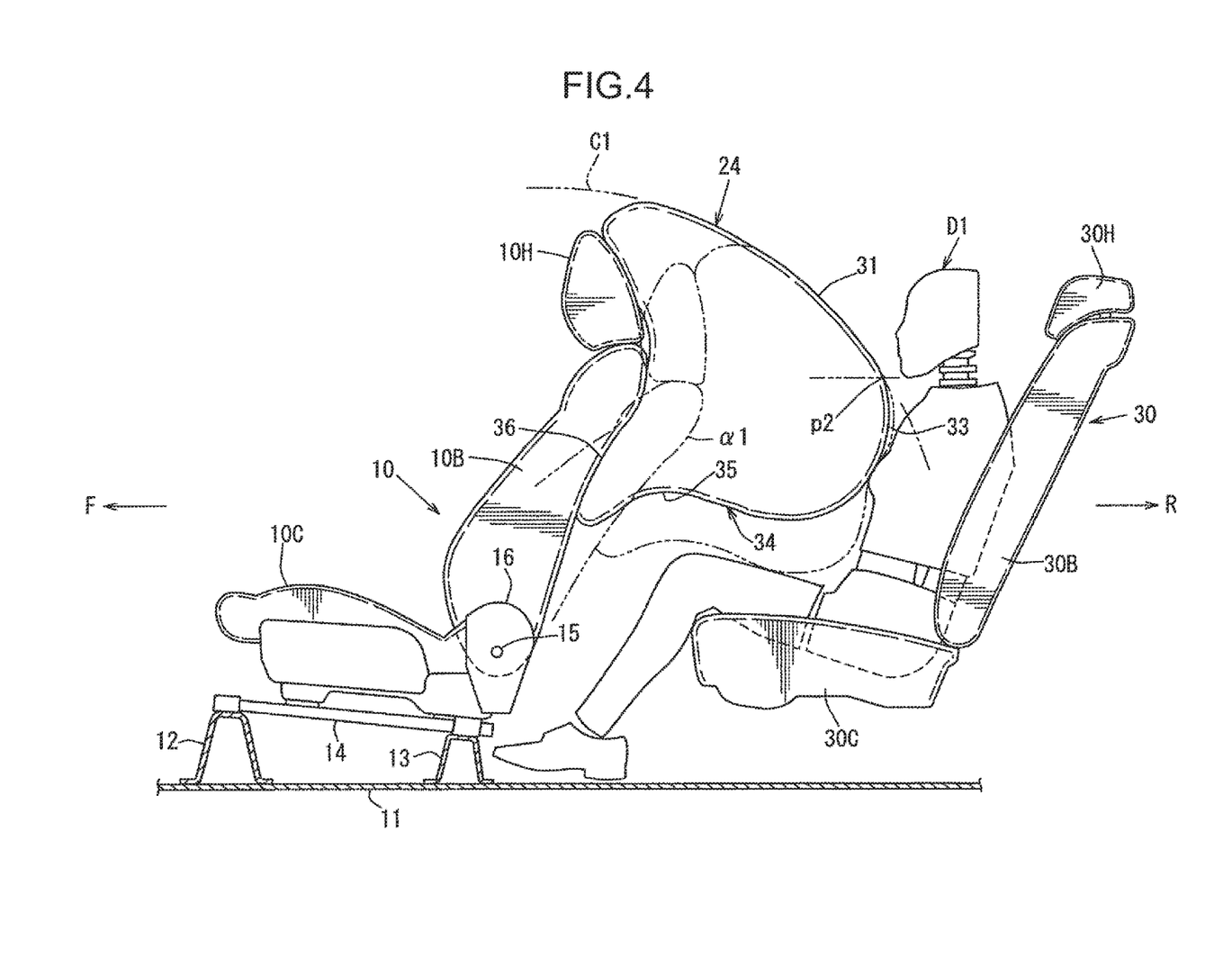
FIG. 4 is a side view, when an air bag deploys in a state that an AF05 dummy is placed on a rear seat.
Figure 5:
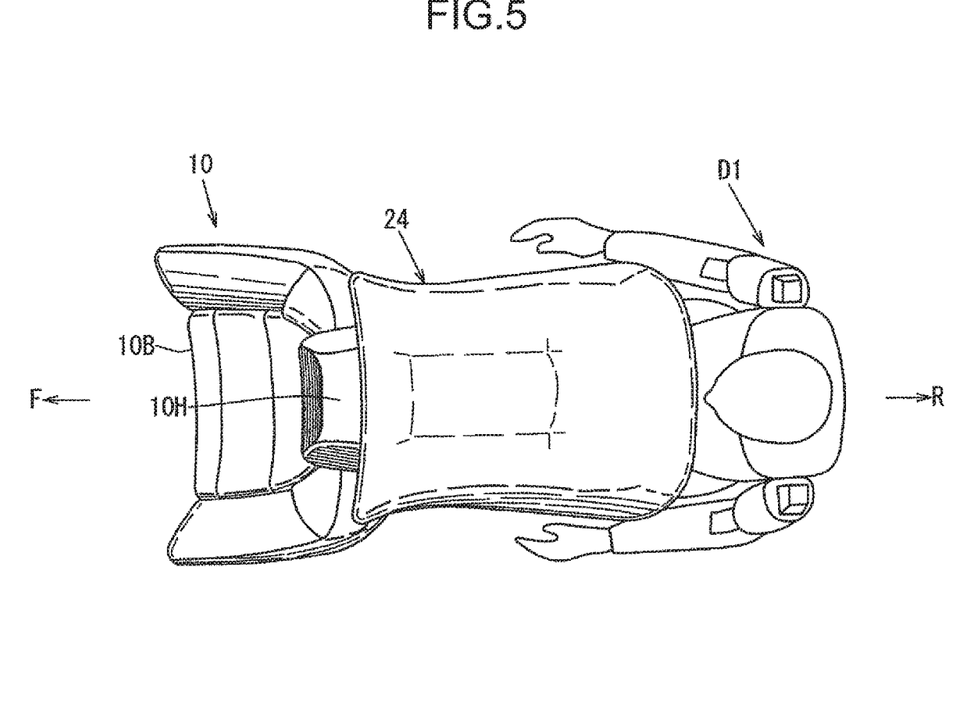
FIG. 5 is a plan view of essential parts in FIG. 4.
Figure 6:
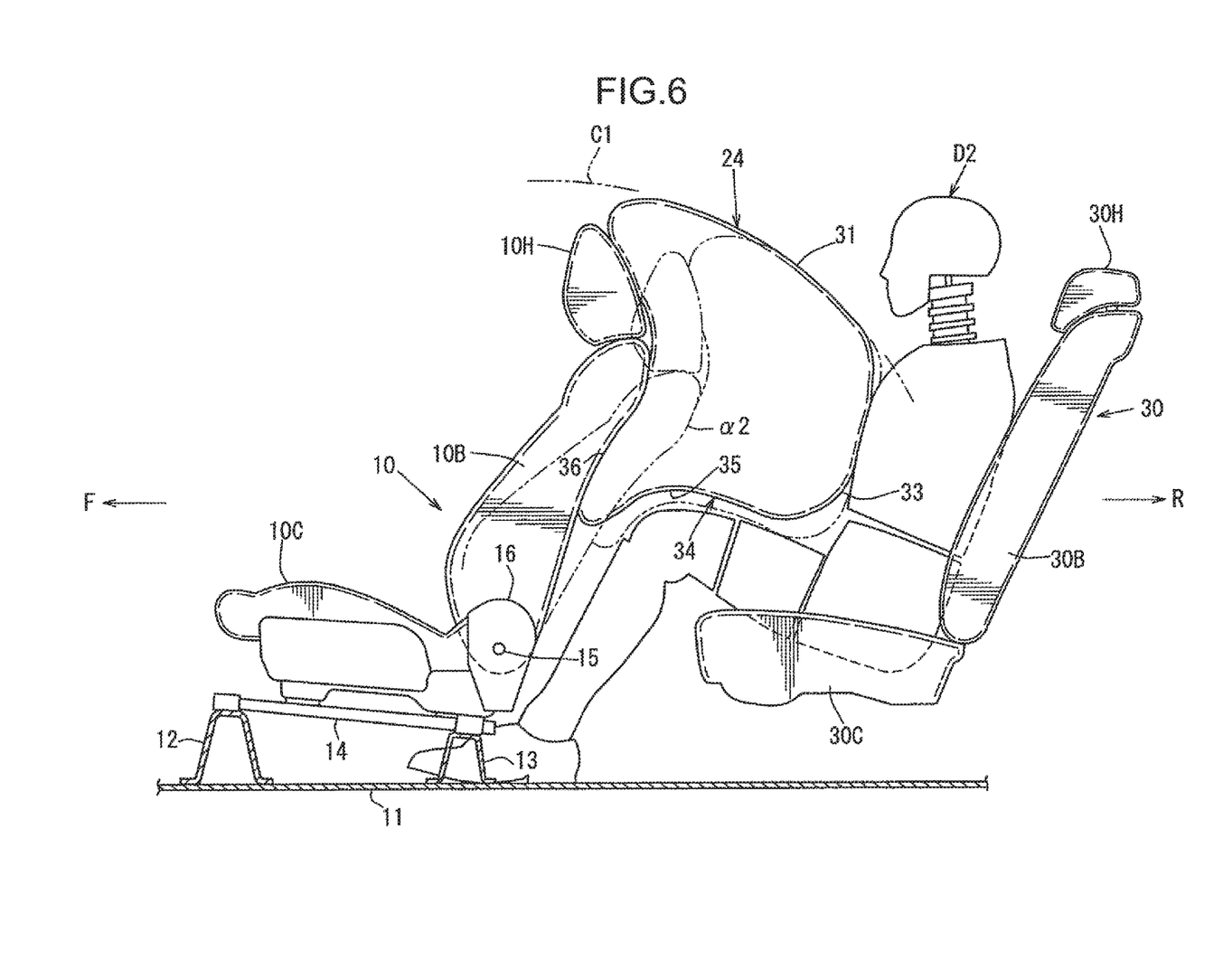
FIG. 6 is a side view, when the air bag deploys in a state that an AM50 dummy is placed on the rear seat.
Figure 7:
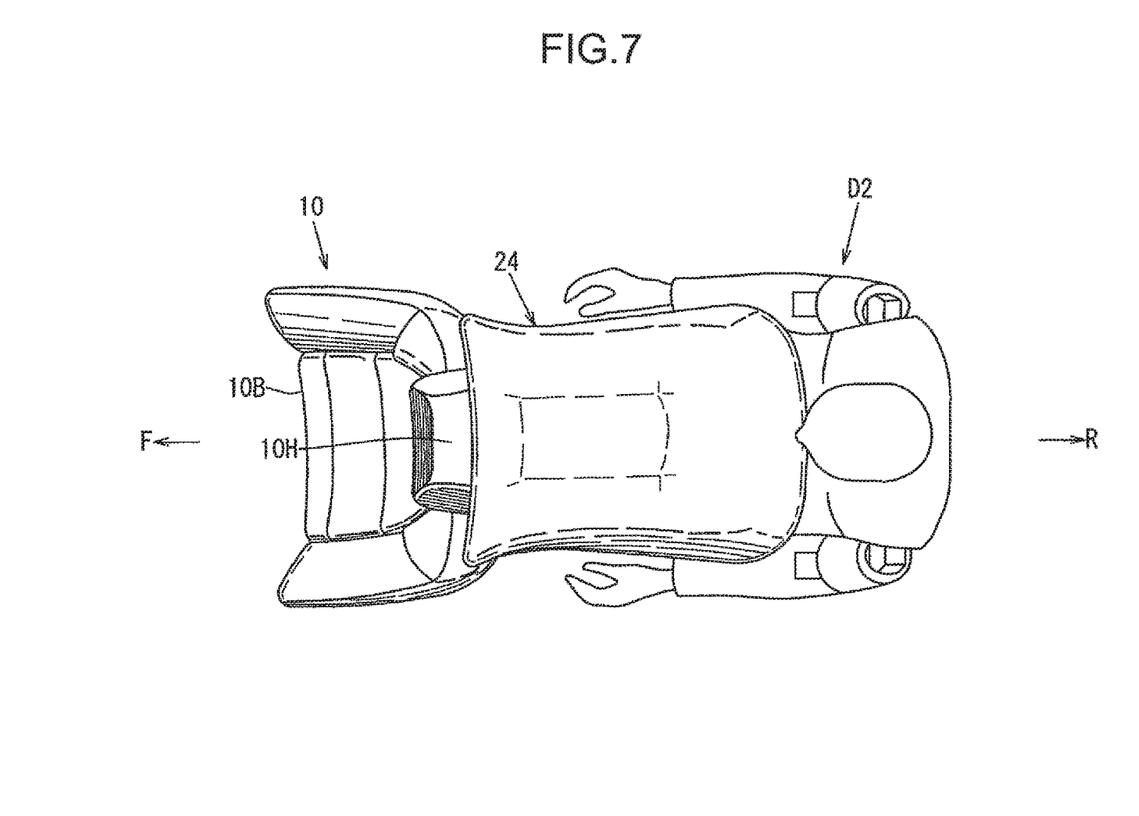
FIG. 7 is a plan view of essential parts in FIG. 6.
Figure 8:
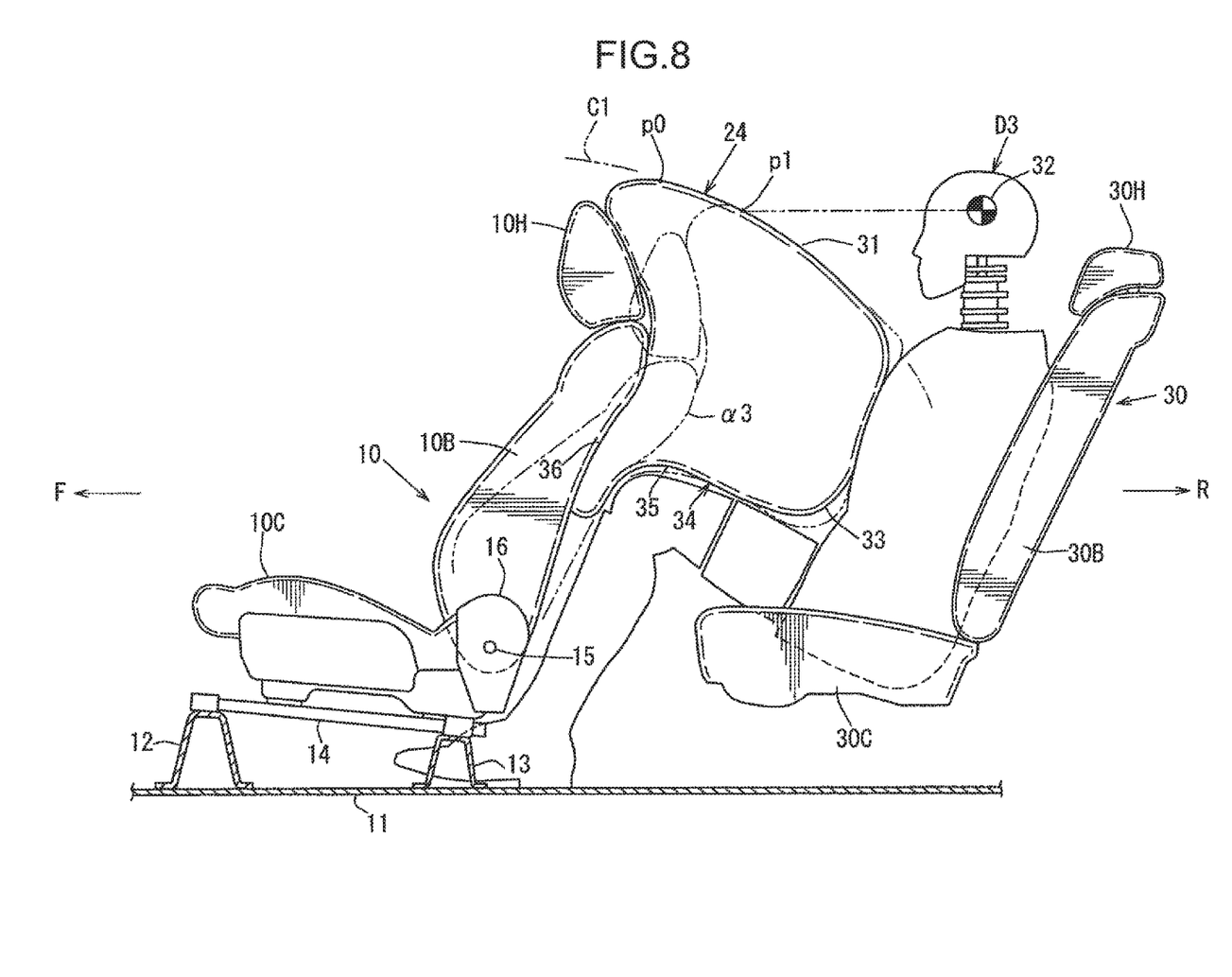
FIG. 8 is a side view, when the air bag deploys in a state that an AM95 dummy is placed on the rear seat.
Figure 9:
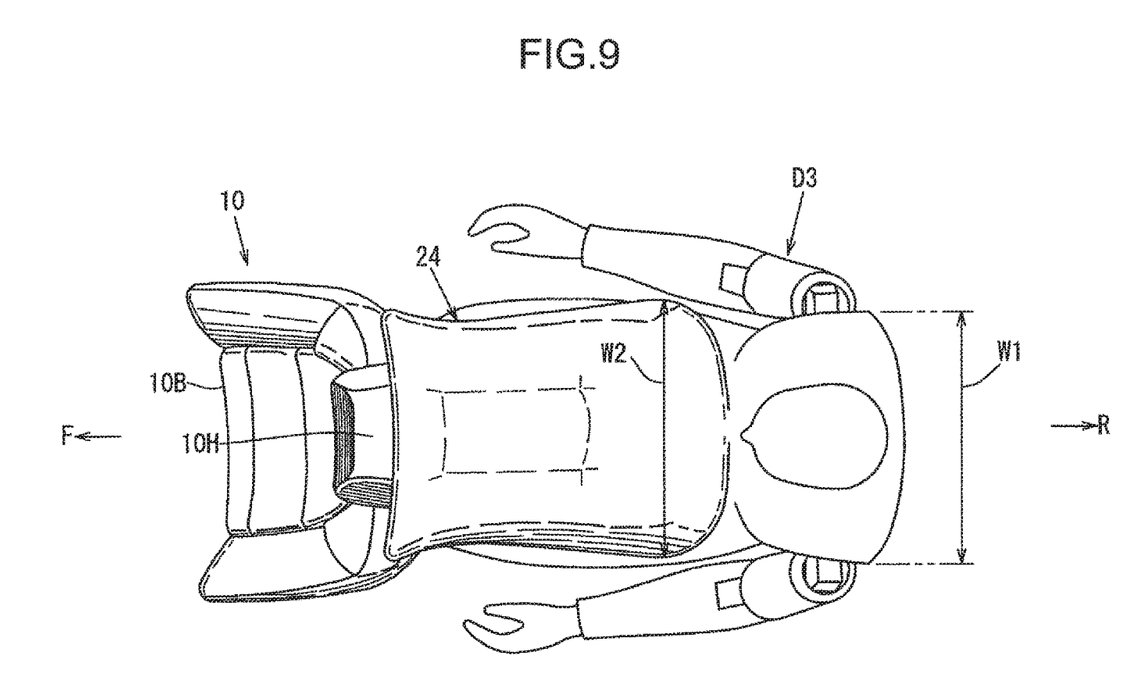
FIG. 9 is a plan view of essential parts in FIG. 8.

FIG. 4 is a side view, when the air bag deploys in a state that an AF05 dummy D1 is placed on the rear seat 30. FIG. 5 is a plan view of essential parts in FIG. 4. FIG. 6 is a side view, when the air bag deploys in a state that an AM50 dummy D2 is placed on the rear seat 30. FIG. 7 is a plan view of essential parts in FIG. 6. FIG. 8 is a side view, when the air bag deploys in a state that an AM95 dummy D3 is placed on the rear seat 30. FIG. 9 is a plan view of essential parts in FIG. 8.

The AF05 dummy D1 is a human body dummy of a small-sized American female adult (woman of height from 148.6 to 153.7 cm and weight from 44.1 to 48.6 kg). The AM50 dummy D2 is a human body dummy of an average-sized American male adult (man of height from 160.0 to 177.8 cm and weight from 59.5 to 80.5 kg). The AM95 dummy D3 is a human body dummy of a large-sized American male adult (man of height from 185.4 to 189.2 cm and weight from 98.6 to 109.1 kg).

As illustrated in FIG. 1, the air bag 24 in a deployed state includes an arc-shaped area 31 (see the area indicated by the arrow in FIG. 1) such that an upper rear portion of the air bag 24 is formed into an arc shape that coincides or substantially coincides with an arc C1 about the reclining pivot axis 15 in a side view of the vehicle.

The deployed shape of the air bag 24 is retained by a plurality of tethers formed in the air bag 24. Vent holes as discharge holes for controlling an inner pressure of the air bag to discharge gas are formed in required positions of the air bag 24. Further, as illustrated in FIGS. 5, 7, and 9, the deployed shape of the air bag 24 in a plan view is formed to be a substantially rectangular shape.

Since the air bag 24 has the arc-shaped area 31, the air bag device can appropriately protect a passenger seated on the rear seat 30 with a simplified structure, irrespective of a reclining angle of the seat back 10B of the front seat 10.

Specifically, as illustrated in FIG. 4, also when the AF05 dummy D1 is placed on the rear seat 30, and a reclining angle of the seat back 10B of the front seat 10 is set large, specifically, also when the seat back 10B is inclined rearwardly (reclined) from the solid line position in FIG. 4 to the imaginary line position α1 in FIG. 4, the arc-shaped area 31 retains a state such that a shape thereof coincides or substantially coincides with the arc C1. Therefore, it is possible to appropriately protect a passenger (a passenger of a physical constitution equivalent to the AF05 dummy D1) seated on the rear seat 30, irrespective of a reclining angle of the seat back 10B of the front seat 10.

Similarly, as illustrated in FIG. 6 or 8, also when the AM50 dummy D2 or the AM95 dummy D3 is placed on the rear seat 30, and the seat back 10B of the front seat 10 is inclined rearwardly (reclined) from the solid line position in FIG. 6 or FIG. 8 to the imaginary line position α2 or α3 in FIG. 6 or FIG. 8, the arc-shaped area 31 retains a state such that a shape thereof coincides or substantially coincides with the arc C1. Therefore, it is possible to appropriately protect a passenger (a passenger of a physical constitution equivalent to the AM50 dummy D2 or the AM95 dummy D3) seated on the rear seat 30, irrespective of a reclining angle of the seat back 10B of the front seat 10.

Further, as illustrated in FIG. 1, the arc-shaped area 31, of an upper rear portion of the air bag 24 in a deployed state, which is formed into an arc shape is set as an area from a position p1 (a head centroid associated position) associated with a head centroid 32 of the AM95 dummy D3 to a position p2 (a jaw associated position or a lower jaw associated position) associated with the jaw (specifically, the lower jaw) of the AF05 dummy D1, when a reclining angle of the seat back 10B of the front seat 10 is equal to a specific angle (as illustrated by the solid line in FIG. 1, an angle θ inclined rearwardly with respect to an imaginary vertical straight line VER by 24 to 26°).

In the embodiment, the arc-shaped area 31 is set as an area from a position p0 (a head top vicinity associated position) associated with a vicinity of the head top of the AM95 dummy D3 to the jaw associated position p2 of the AF05 dummy D1, specifically, to the lower jaw associated position, while including the head centroid position associated position p1 of the AM95 dummy D3, when a reclining angle is equal to the specific reclining angle θ of the seat back 10B.

Thus, deploying the air bag 24 enables to protect the AF05 dummy D1 illustrated in FIG. 4, the AM50 dummy D2 illustrated in FIG. 6, and the AM95 dummy D3 illustrated in FIG. 8, in other words, seated passengers of substantially all physical constitutions from small-sized female adults to large-sized male adults.

In particular, by setting the arc-shaped area 31 as an area from the head top vicinity associated position p0 of the AM95 dummy D3 to the jaw associated position p2 of the AF05 dummy D1, as illustrated by the imaginary line α3 in FIG. 8, even when the seat back 10B of the front seat 10 is inclined further rearwardly from the specific angle θ by about 12 degrees, it is possible to securely receive the head centroid 32 of the AM95 dummy D3 by the air bag 24.

Further, as illustrated in FIG. 1, an area 33 (see the area illustrated by the arrow in FIG. 1), of the air bag 24 in a deployed state, on a lower side with respect to the jaw associated position p2 of the AF05 dummy D1 is formed into an arc shape in a side view of the vehicle. The area 33 is set in such a way that a curvature radius thereof is smaller than a curvature radius of the arc-shaped area 31 (in the embodiment, the curvature radius of the lower area 33 is set to 21 to 23% with respect to the curvature radius of the arc-shaped area 31; however, the numerical value is not limited to the above).

In other words, regarding the air bag 24 in a deployed state, the area 33 (the lower area 33) on a lower side with respect to the jaw associated position p2 has a larger curvature. Accordingly, a projection amount of the air bag 24 in a direction toward a chest portion of a passenger seated on the rear seat 30, particularly, of a small-sized female adult equivalent to the AF05 dummy D1 becomes small, and the chest portion of the seated passenger is less likely to be pressed by the air bag 24.

Further, as illustrated in FIG. 1, an upwardly indented recess portion 35, in a side view of the vehicle, is formed in a lower surface 34 of the air bag 24 in a deployed state in association with a knee portion of a passenger seated on the rear seat 30. The shape of the recess portion 35 is also retained by the tethers formed in the air bag 24.

By forming the recess portion 35, a knee portion of a seated passenger, particularly, of even a large-sized male adult equivalent to the AM95 dummy D3 illustrated in FIG. 8 is less likely to be pressed, and movement of the knee portion is not impaired.

Further, as illustrated in FIG. 8, when the AM95 dummy D3 is placed on the rear seat 30, and a reclining angle of the seat back 10B of the front seat 10 is equal to the specific angle θ, the deployed air bag 24 is configured in such a way that the lower surface 34 including the recess portion 35 does not come into contact with a femoral region of the AM95 dummy D3. Thus, even in a large-sized male adult equivalent to the AM95 dummy D3, pressing of the femoral region by the air bag 24 is avoided.

Furthermore, as illustrated in FIG. 9, a maximum width W2 of the air bag 24 in a deployed state in the vehicle width direction is set to be equal to or larger than a shoulder width W1 (a so-called torso width) of the AM95 dummy D3 placed on the rear seat 30 in a plan view (in other words, W2>W1). Thus, it is possible to sufficiently secure passenger protection performance with respect to seated passengers of substantially all physical constitutions equivalent to the AF05 dummy D1 illustrated in FIG. 5, the AM50 dummy D2 illustrated in FIG. 7, and the AM95 dummy D3 illustrated in FIG. 9.

In addition, as illustrated in FIG. 1, in order to increase a restraining force of a passenger by the air bag 24 in a deployed state, particularly, a restraining force of an upper part of the body of a passenger, the air bag 24 is configured in such a way that a reaction force surface 36 (a surface of the air bag 24 illustrated in a side view of FIG. 1 on the left side in FIG. 1) comes into contact with a back surface of the seat back 10B.

Also, in order to suppress fluctuation of the air bag 24 when deploying, as illustrated in FIG. 1, the air bag 24 is configured in such a way that not only a back surface of an upper end of the seat back 10B including a back surface of an intermediate portion of the seat back 10B in an up-down direction, but also a back surface of an upper portion of the head rest 10H come into contact with the reaction force surface 36. In other words, the air bag 24 is configured in such a way as to secure the reaction force surface 36 of a long length in the up-down direction as much as possible.

In this way, the air bag device according to the embodiment is an air bag device including the air bag 24 that deploys from the back surface of the seat back 10B of the front seat 10 toward the rear seat 30. The air bag 24 in a deployed state is configured in such a way that at least an upper rear portion is formed into an arc shape (see the arc-shaped area 31) about the reclining pivot axis 15 in a side view of the vehicle (see FIG. 1).

In this configuration, since at least the upper rear portion of the air bag 24 in a deployed state is formed into an arc shape about the reclining pivot axis 15 in a side view of the vehicle, as described above, it is possible to appropriately protect a passenger seated on the rear seat 30 with a simplified structure for specifying a deployed shape of the air bag 24, irrespective of a reclining angle of the seat back 10B of the front seat 10.

Further, in a deployed state, the arc-shaped area 31, on the upper rear portion of the air bag 24, which is formed into an arc shape is set as an area from the head centroid 32 associated position p1 of the AM95 dummy D3 to the jaw associated position p2 of the AF05 dummy D1, when a reclining angle of the seat back 10B of the front seat 10 is equal to the specific angle θ (see FIG. 1).

Therefore, as described above, deploying the air bag 24 enables to protect seated passengers of substantially all physical constitutions from large-sized male adults to small-sized female adults.

Further, an area (see the lower area 33), of the air bag 24 in a deployed state, on a lower side with respect to the jaw associated position p2 of the AF05 dummy D1 is formed to have a curvature radius smaller than the curvature radius of the arc-shaped area 31 (see FIG. 1).

Therefore, as described above, a projection amount of the air bag 24 in a direction toward a chest portion of a seated passenger becomes small, and the chest portion of the seated passenger is less likely to be pressed by the air bag 24.

Further, the upwardly indented recess portion 35 is formed in the lower surface 34 of the air bag 24 in a deployed state in association with a knee portion of a passenger (see FIGS. 1 and 8).

Therefore, as described above, the knee portion of the seated passenger is less likely to be pressed by the air bag 24.

Regarding correspondence between a configuration according to the present invention and the embodiment, an area, of an air bag according to the present invention, on a lower side with respect to the jaw associated position of the AF05 dummy corresponds to the lower area 33 according to the embodiment. The present invention, however, is not limited to the configuration of the embodiment.

The following is an overview of the present invention described above.

An air bag device according to the present invention is an air bag device to be installed in a vehicle provided with a front seat and a rear seat disposed away from each other in a front-rear direction of the vehicle, and a reclining mechanism provided in the front seat to allow a seat back to pivot about a reclining pivot axis. The air bag device includes an air bag that deploys from a back surface of the seat back of the front seat toward the rear seat. At least an upper rear portion of the air bag in a deployed state is formed into an arc shape about the reclining pivot axis in a side view of the vehicle.

The front seat and the rear seat may be set as a seat of a first row (a front seat) such as a driver's seat or an assistant driver's seat, and a seat of a second row (a rear seat) immediately behind the front seat; or may be set as a seat of a second row (a front seat) and a seat of a third row (a rear seat).

In the above configuration, since at least the upper rear portion of the air bag in a deployed state is formed into an arc shape the reclining pivot axis in a side view of the vehicle about, it is possible to appropriately protect a passenger seated on the rear seat with a simplified structure for specifying a deployed shape of the air bag, irrespective of a reclining angle of the seat back of the front seat.

According to an aspect of the present invention, in a state that a reclining angle of the seat back of the front seat is set to a specific angle, an AM95 dummy is placed on the rear seat, and an AF05 dummy is placed on the rear seat, an arc-shaped area being an area, of the upper rear portion of the air bag in a deployed state, which is formed into the arc shape is an area from a head centroid associated position of the AM95 dummy to a jaw associated position of the AF05 dummy.

The AM95 dummy is a dummy of a large-sized American male adult, and the AF05 dummy is a dummy of a small-sized American female adult. Further, the dummy is a human body dummy for use as a tool for assessing passenger safety in a collision test, and is formally called anthropomorphic test dummy. Further, the specific angle of the reclining angle indicates an angle inclined rearwardly with respect to an imaginary vertical straight line by 24 to 26°.

In the above configuration, deploying the air bag enables to protect seated passengers of substantially all physical constitutions from large-sized male adults to small-sized female adults.

According to an aspect of the present invention, an area, of the air bag in a deployed state, on a lower side with respect to the jaw associated position of the AF05 dummy is formed into an arc shape in a side view of the vehicle in such a way that a curvature radius of the lower area is smaller than a curvature radius of the arc-shaped area.

In the above configuration, since the area on the lower side with respect to the jaw associated position of the AF05 dummy is formed to have a smaller curvature radius, a projection amount of the air bag in a direction toward a chest portion of a seated passenger is made small, and the chest of the seated passenger is less likely to be pressed by the air bag.

According to an aspect of the present invention, an upwardly indented recess portion associated with a knee portion of a passenger seated on the rear seat is formed in a lower surface of the air bag in a deployed state.

In the above configuration, by forming the recess portion, the knee portion of the seated passenger is less likely to be pressed by the air bag.

INDUSTRIAL APPLICABILITY

As described above, the present invention is useful for an air bag device to be installed in a vehicle including a front seat and a rear seat disposed away from each other in a front-rear direction of the vehicle, and a reclining mechanism provided in the front seat to allow a seat back to pivot about a reclining pivot axis.

The invention claimed is:

1. An air bag device to be installed in a vehicle provided with a front seat and a rear seat disposed away from each other in a front-rear direction of the vehicle, and a reclining mechanism provided in the front seat to allow a seat back to pivot about a reclining pivot axis, comprising:
   an air bag that deploys from a back surface of the seat back of the front seat toward the rear seat, wherein
   at least an upper rear portion of the air bag in a deployed state is formed into an arc shape about the reclining pivot axis in a side view of the vehicle, and
   in a state that a reclining angle of the seat back of the front seat is set to a specific angle, an AM95 dummy is placed on the rear seat, and an AF05 dummy is placed on the rear seat,
   an arc-shaped area being an area, of the upper rear portion of the air bag in a deployed state, which is formed into the arc shape is an area from a head centroid associated position of the AM95 dummy to a jaw associated position of the AF05 dummy.

2. The air bag device according to claim 1, wherein
   an area, of the air bag in a deployed state, on a lower side with respect to the jaw associated position of the AF05 dummy is formed into an arc shape in a side view of the vehicle in such a way that a curvature radius of the lower area is smaller than a curvature radius of the arc-shaped area.

3. The air bag device according to claim 2, wherein
   an upwardly indented recess portion associated with a knee portion of a passenger seated on the rear seat is formed in a lower surface of the air bag in a deployed state.

4. The air bag device according to claim 1, wherein
   an upwardly indented recess portion associated with a knee portion of a passenger seated on the rear seat is formed in a lower surface of the air bag in a deployed state.

* * * * *